United States Patent
Lada et al.

(10) Patent No.: US 10,455,033 B2
(45) Date of Patent: Oct. 22, 2019

(54) SYSTEMS AND METHODS FOR EVALUATING USER ACTIVITY

(71) Applicant: Facebook, Inc., Menlo Park, CA (US)

(72) Inventors: Akos Lada, San Francisco, CA (US); Alexander Peysakhovich, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 188 days.

(21) Appl. No.: 15/156,173

(22) Filed: May 16, 2016

(65) Prior Publication Data

US 2017/0331910 A1 Nov. 16, 2017

(51) Int. Cl.
*H04L 29/08* (2006.01)
*H04L 12/24* (2006.01)
*G06N 20/00* (2019.01)
*G06Q 10/04* (2012.01)
*G06Q 10/10* (2012.01)
*G06Q 50/00* (2012.01)
*G06Q 10/06* (2012.01)

(52) U.S. Cl.
CPC ............ *H04L 67/22* (2013.01); *G06N 20/00* (2019.01); *G06Q 10/04* (2013.01); *G06Q 10/0639* (2013.01); *G06Q 10/101* (2013.01); *G06Q 10/107* (2013.01); *G06Q 50/01* (2013.01); *H04L 41/16* (2013.01)

(58) Field of Classification Search
CPC ....... H04L 67/22; H04L 43/045; H04L 67/12; G06N 20/00; G06N 7/005; G06N 3/02; G06N 5/046; G06N 5/047; G06N 3/08; G06N 7/02; G06Q 50/01; G06Q 30/0201; G06Q 30/02; G06Q 10/06375; G05B 19/4185; G05B 23/0283; G05B 19/4183
See application file for complete search history.

(56) References Cited

U.S. PATENT DOCUMENTS

| 2015/0046384 A1* | 2/2015 | Eck | G06F 17/18 706/52 |
|---|---|---|---|
| 2016/0350103 A1* | 12/2016 | Doganata | G06F 8/70 |
| 2017/0149721 A1* | 5/2017 | Brunn | H04L 67/306 |
| 2017/0178080 A1* | 6/2017 | Abebe | G06Q 10/1095 |

OTHER PUBLICATIONS

Tomas Borovicka, Marcel Jirina Jr., Pavel Kordik and Marcel Jirina, Selecting Representative Data Sets, 2012, http://cdn.intechopen.com/pdfs/39037/InTechSelecting_representative_data_sets.pdf (Year: 2012).*

* cited by examiner

*Primary Examiner* — Glenford J Madamba
*Assistant Examiner* — Abderrahmen Chouat
(74) *Attorney, Agent, or Firm* — Sheppard Mullin Richter & Hampton LLP

(57) ABSTRACT

Systems, methods, and non-transitory computer-readable media can determine an event that may affect at least one activity being performed by a first group of users through the computing system. A set of first measurements of the at least one activity being performed by the first group of users over a period of time are determined. A set of second measurements of the at least one activity for the first group of users over the period of time are generated, wherein the set of second measurements are predicted based at least in part on a machine learning model. Data describing an impact of the event on the first group of users is generated based at least in part on the set of first measurements and the set of second measurements.

17 Claims, 8 Drawing Sheets

SYSTEMS AND METHODS FOR EVALUATING USER ACTIVITY

FIELD OF THE INVENTION

The present technology relates to the field of evaluating user activity. More particularly, the present technology relates to techniques for evaluating changes to user activity over time.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

SUMMARY

Various embodiments of the present disclosure can include systems, methods, and non-transitory computer readable media configured to determine an event that may affect at least one activity being performed by a first group of users through the computing system. A set of first measurements of the at least one activity being performed by the first group of users over a period of time are determined. A set of second measurements of the at least one activity for the first group of users over the period of time are generated, wherein the set of second measurements are predicted based at least in part on a machine learning model. Data describing an impact of the event on the first group of users is generated based at least in part on the set of first measurements and the set of second measurements.

In some embodiments, the systems, methods, and non-transitory computer readable media are configured to train the machine learning model to output forecasted measurements of the at least one activity for the first group of users, wherein each forecasted measurement corresponds to a unit of time.

In some embodiments, the systems, methods, and non-transitory computer readable media are configured to generate a set of training examples that each include respective counts of the at least one activity having been performed by each group of users in a set of groups over a period of time that precedes the event, the set of groups including the first group of users and a plurality of different groups of users.

In some embodiments, the systems, methods, and non-transitory computer readable media are configured to provide respective counts of the at least one activity having been performed by each group of users in a set of groups during a unit of time to the machine learning model, the set of groups not including the first group of users, wherein the machine learning model outputs a predicted measurement of the at least one activity for the first group of users corresponding to the unit of time.

In some embodiments, the predicted measurement is a prediction interval within which a count of the at least one activity for the first group of users was expected had the event not occurred.

In some embodiments, the systems, methods, and non-transitory computer readable media are configured to generate a visual graph that plots the set of first measurements and the set of second measurements over the period of time.

In some embodiments, the first group of users includes users that are associated with a geographic region, users that share at least one specified demographic attribute, or users that share at least on specified behavioral attribute.

In some embodiments, the systems, methods, and non-transitory computer readable media are configured to determine a date on which a feature is available to the group of users.

In some embodiments, the systems, methods, and non-transitory computer readable media are configured to determine a date on which a real-world event was experienced by at least some of users in the first group of users.

In some embodiments, the at least one activity corresponds to: a number of likes performed, a number of comments posted, a number of content items shared, a number of content items accessed, a number of content items of a specified type accessed, a number of content items in a specified category accessed, an amount of time spent while accessing content items, or any combination of thereof.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
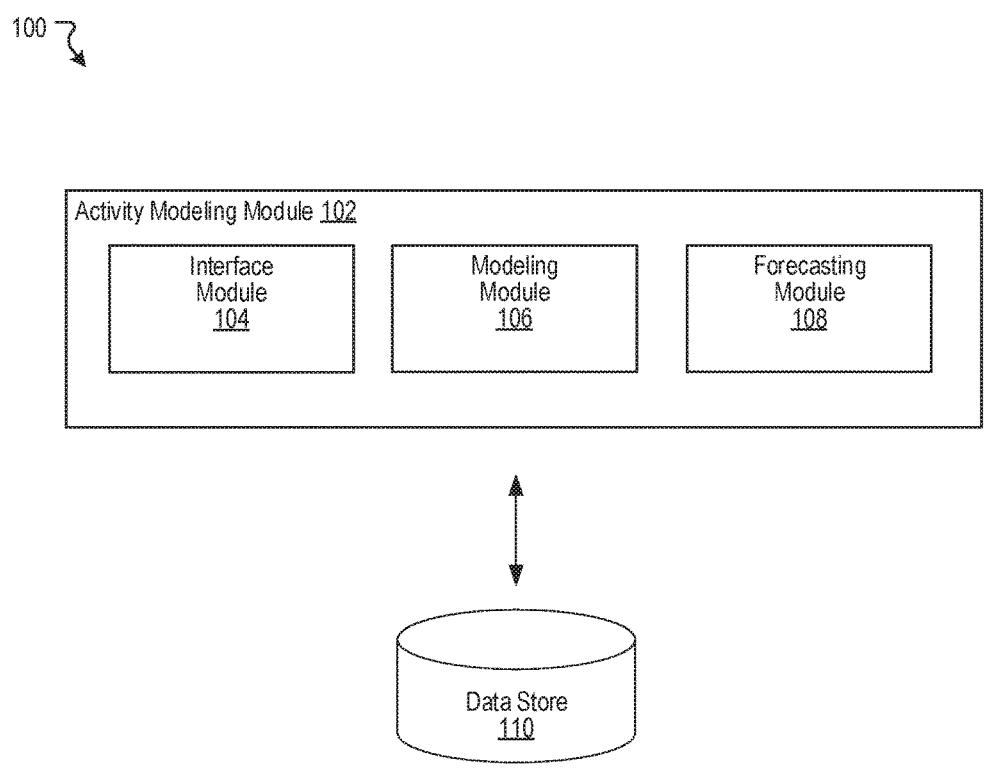
FIG. 1 illustrates an example system including an example activity modeling module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Evaluating User Activity

People often utilize computing devices (or systems) for a wide variety of purposes. Users can use their computing devices to, for example, interact with one another, access content, share content, and create content. In some cases, content items can include postings from members of a social networking system. The postings may include text and media content items, such as images, videos, and audio. The postings may be published to the social network for consumption by others. Users of the social networking system may interact with other users and/or posts that were published through the social networking system. Such interactions may involve selecting options, such as a "like" option for endorsing various content published through the social networking system (e.g., a post, a link, an image, etc.), posting comments on the various content, sharing the various content, and/or simply accessing the various content for some measurable period of time, to name some examples.

There may be instances in which user activity in the social networking system needs to be evaluated. In one example, user activity may need to be evaluated to determine the efficacy of a new feature that was made available to a group of users of the social networking system. For example, a new feature may have be launched to users that are located in the country of Portugal. In this example, to provide a useful measurement, the user activity that occurs in Portugal after the feature was launched would need to be evaluated with respect to the user activity that would have occurred in Portugal had the feature not been launched. Such measurement can be used to determine any change in user activity after an event, e.g., whether user engagement in Portugal increased or decreased after the feature was launched. Some examples of the types of user activity that may be measured include changes in the number of likes performed by the group of users (e.g., users in Portugal), changes in the number of comments posted in the social networking system by the group of users, changes in the number of content items being shared, or re-shared, by the group of users, changes in the amount of time spent by the group of users while accessing, or viewing, content items, etc.

Under conventional approaches, the user activity that was measured in Portugal after the feature was launched can be evaluated against the user activity of a control group to determine the amount of impact the feature had on users in Portugal. In general, to provide a useful comparison, the control group would include some segment of users that are representative of Portuguese users but to whom the new feature was not made available. For example, the control group may include users of another country that tend to behave similarly to Portuguese users, e.g., Spain. After comparing user activity between Portuguese users and the control group, a determination can be made as to what impact, if any, the feature had on Portuguese users. Such conventional approaches can be problematic because they require identification of a control group that is representative of the population being tested. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, a machine learning model is trained to generate synthetic control data for a group of users being evaluated. In general, a group may correspond to any segment of users. For example, a group of users may correspond to users that are located in a specified geographic region (e.g., zip code, city, state, country, continent, etc.). In another example, a group of users may correspond to users that share certain attributes (e.g., gender, age group, interests, etc.). When a new feature (e.g., product, software-based feature, interface, layout, etc.) is made available to a group of users, the actual user activity measured for that group of users over some period of time can be compared against the synthetic, or predicted, user activity for the group of users over the period of time. This comparison can allow a determination as to what impact, if any, the launch of the new feature had on the group of users. Although the approaches described herein reference users of a social networking system, these approaches can readily be adapted to utilize any user data for which a time series is available.

FIG. 1 illustrates an example system 100 including an example activity modeling module 102, according to an embodiment of the present disclosure. As shown in the example of FIG. 1, the activity modeling module 102 can include an interface module 104, a modeling module 106, and a forecasting module 108. In some instances, the example system 100 can include at least one data store 110. The components (e.g., modules, elements, etc.) shown in this figure and all figures herein are examples only, and other implementations may include additional, fewer, integrated, or different components. Some components may not be shown so as not to obscure relevant details.

In some embodiments, the activity modeling module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the activity modeling module 102 can be implemented, in part or in whole, as software running on one or more computing devices or systems, such as on a user or client computing device. For example, the activity modeling module 102, or at least a portion thereof, can be implemented as or within an application (e.g., app), a program, or an applet, etc., running on a user computing device or a client computing system, such as the user device 710 of FIG. 7. In another example, the activity modeling module 102, or at least a portion thereof, can be implemented using one or more computing devices or systems that include one or more servers, such as network servers or cloud servers. In some instances, the activity modeling module 102 can, in part or in whole, be implemented within or configured to operate in conjunction with a social networking system (or service), such as the social networking system 730 of FIG. 7. It should be understood that there can be many variations or other possibilities.

The activity modeling module 102 can be configured to communicate and/or operate with the at least one data store 110, as shown in the example system 100. The at least one data store 110 can be configured to store and maintain various types of data. For example, the data store 110 can store information describing user activity in the social networking system. In some implementations, the at least one data store 110 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user specified settings, content produced or posted by users, and various other types of user data.

As mentioned, the activity modeling module 102 can, in part or in whole, be implemented within or configured to operate in conjunction with a social networking system (or service). In various embodiments, the activity modeling module 102 can be configured to train and utilize a model for generating synthetic control data for various groups of users. In some embodiments, the interface module 104 can be configured to provide an interface for specifying various inputs for generating the synthetic control data. More details regarding the interface module 104 will be provided below with reference to FIG. 2. In various embodiments, the modeling module 106 can train a machine learning model to generate the synthetic control data based on the inputs specified through the interface module 104. More details regarding the modeling module 106 will be provided below with reference to FIG. 3. Once the model is trained, the forecasting module 108 can be used to generate the synthetic control data and provide resources for evaluating any changes in user activity with respect to one or more events. More details regarding the forecasting module 108 will be provided below with reference to FIG. 4.

Figure 2:
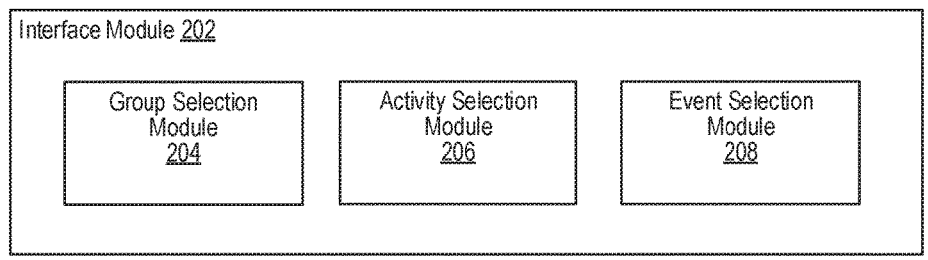
FIG. 2 illustrates an example interface module, according to an embodiment of the present disclosure.

FIG. 2 illustrates an example interface module 202, according to an embodiment of the present disclosure. In some embodiments, the interface module 104 of FIG. 1 can be implemented with the interface module 202. As shown in the example of FIG. 2, the interface module 202 can include a group selection module 204, an activity selection module 206, and an event selection module 208. The interface module 202 can provide an interface (e.g., a graphical user interface and/or application programming interface) for specifying various inputs, or parameters, for generating synthetic control data for a group of users. In some embodiments, the inputs are used to train a machine learning model for generating the synthetic control data as described in reference to FIG. 3.

In various embodiments, the group selection module 204 can be utilized to specify a group of users to be evaluated in view of one or more events. For example, one may want to measure changes that result in the activity of users that are located in a given country in response to the users being introduced a new feature through a social networking system (e.g., the social networking system 730 of FIG. 7). In one example, a group of users may be defined as some, or all, users that are associated with a geographic region (e.g., zip code, city, state, country, continent, etc.). For example, users of the social networking system may be associated with certain geographic regions. In some instances, users may be associated with a geographic region based on geolocation data that corresponds to the respective computing devices from which those users access the social networking system. In some instances, users may provide information that describes one or more geographic regions in which the users reside or with which the users are otherwise affiliated. For example, geographic information may be provided in a user's social profile that is published through the social networking system. Such information can be used to associate users with geographic regions. When defining the group of users, the geographic region that is of interest can be specified through the group selection module 204. Based on the specified geographic region, the group selection module 204 can automatically identify users that are associated with the geographic region and can include these users in the group of users to be evaluated.

The group of users may be defined in a number of different ways. For example, the group of users may be defined as some, or all, users that share certain attributes. These attributes may correspond to demographic information, e.g., gender, age group, interests, language preference, etc. Such attributes may also be determined implicitly based on user behavior or habits. For example, an attribute may correspond to how frequently a user accesses the social networking system, how frequently a user performs certain operations through the social networking system (e.g., user performs a threshold number of likes, comments, shares, etc.), whether the user is categorized as a new user or an advanced user, to name some examples. In general, such user attributes may be determined, for example, using information that was provided by a user to the social networking system. In another example, such attributes may be determined based on the user's interactions through the social networking system, for example, with other users of the social networking system and/or with content items that are published through the social networking system.

In various embodiments, the activity selection module 206 can be used to specify one or more user activities to be measured. An activity may correspond to any measurable operation and/or interaction in the social networking system. In one example, an entity may want to measure changes in the number of likes that are performed by the specified group of users after an event (e.g., new feature launch). In this example, the activity selection module 206 can be utilized to specify the measured activity as the number of likes. Other examples of measurable, or quantifiable, activities include the number of comments posted in the social networking system by the group of users, the number of content items being shared, or re-shared, by the group of users, the number of content items of a specified type (e.g., pages, images, videos, audio, etc.) being accessed by the group of users, the number of content items in a category (or topic) being accessed by the group of users, the amount of time spent by the group of users while accessing (or viewing) content items, or any combination of these and/or other measurable activities.

The event selection module 208 can be utilized to specify a time at which the event occurs. The event time may be specified as a time of day, day of the week, holiday, or date, to name some examples. In some embodiments, the specified event time corresponds to a point in time after which synthetic control data will be generated for a specified user activity for a group of users. This synthetic control data can then be evaluated against the actual user activity that occurs by the group of users after the specified event time. In one example, the specified event time may correspond to the launch of a feature. For example, a new feature (e.g., software-based feature, interface, layout, etc.) may be launched in the social networking system to a group of users. When the new feature is made available to the group of users, the actual user activity measured for that group of users can be compared against the synthetic, or predicted, user activity for the group of users. This comparison can allow a determination as to what effect, if any, the launch of the new feature had on the group of users. The event need not always correspond to a feature launch. For example, the specified event time may correspond to the time of a real world event (e.g., natural disaster, holiday, etc.). In this example, the actual user activity measured for a group of users after the real world event can be compared against the synthetic user activity for the group of users. This comparison may be used to determine what impact, if any, the real world event had on the group of users while interacting with the social networking system.

Figure 3:
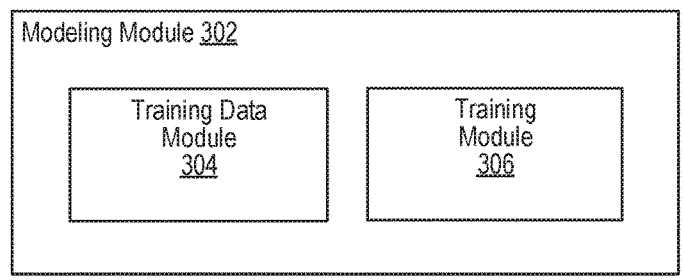
FIG. 3 illustrates an example modeling module, according to an embodiment of the present disclosure.

FIG. 3 illustrates an example modeling module 302, according to an embodiment of the present disclosure. In some embodiments, the modeling module 106 of FIG. 1 can be implemented with the modeling module 302. As shown in the example of FIG. 3, the modeling module 302 can include a training data module 304 and a training module 306.

In various embodiments, the training data module 304 is configured to generate training data to be used for determining synthetic control data for a specified user activity that is performed by a specified group of users. In some embodiments, the synthetic control data for the specified group of users is predicted using a trained machine learning model. In such embodiments, the model is trained to predict the synthetic user activity of the specified group of users in relation to the actual user activity corresponding to a set of different groups of users. The different group of users can be defined in a manner similar to how the specified group of users was defined. For example, if the group of users was defined as a country, then the set of different groups could include respective groups of users corresponding to some or all other countries in the world. In another example, if the group of users was specified as a particular age group (e.g., 18 to 24 years), then the set of different groups could include respective groups of users corresponding to some or all other age groups (e.g., 1 to 12 years, 13 to 17 years, 25 to 40 years, 41 to 59 years, and 59+ years).

The training data used to train the machine learning model can include a number of training examples. In some embodiments, each training example includes a respective amount of a specified user activity that was measured over a unit of time for the specified group of users and for each group included in the set of different groups of users. For example, if the user activity being measured is the number of likes performed by users, then each training example can include the respective number of likes performed over a unit of time (e.g., day) by the specified group of users (e.g., users in Portugal) as well as by each group included in the set of different groups of users (e.g., users in Spain, China, United States, Ecuador, India, Brazil, Australia, England, France, etc.). The number of training examples used can be set by default. For example, each training example may correspond to user activity measured in a given day over the course of six months. In this example, there may be a total of 180 training examples (average of 30 days per month×6 months). This time period can be tunable, either manually or algorithmically, as appropriate. The unit of time to which each training example corresponds can also be adjusted as appropriate so that the training examples correspond to a shorter unit of time (e.g., each training example corresponds to one hour of user activity) or a longer unit of time (e.g., each training example corresponds to one week of user activity). One example representation of a training example is as follows:

$$[Y_t, x_t^1, \ldots, x_t^n],$$

where $Y_t$ corresponds to user activity measured over a unit of time t for the specified group of users, where $x_t^1$ corresponds to user activity measured over the unit of time t for a first group in the set of different groups of users, and where $x_t^n$ corresponds to user activity measured over the unit of time t for an nth group in the set of different groups of users.

The training module 306 can use these training examples to train the machine learning model. In general, any type of machine learning model may be used to generate the synthetic control data. In one example, the machine learning model is trained using a regularized regression technique. Once trained, the machine learning model can be used to generate synthetic control data for the specified group of users for some unit of time after the specified event time, as described in reference to FIG. 4.

Figure 4:
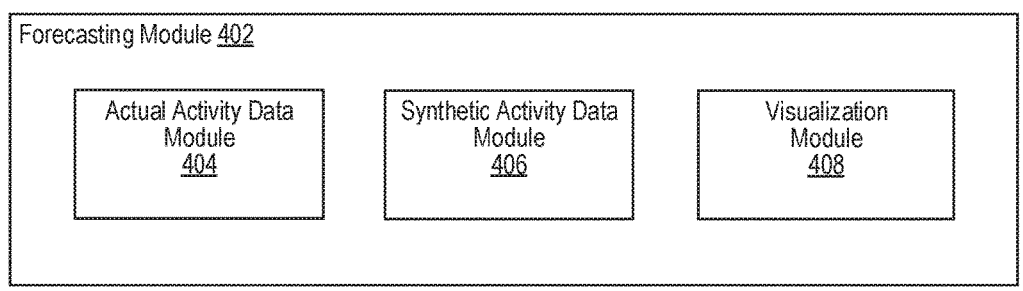
FIG. 4 illustrates an example forecasting module, according to an embodiment of the present disclosure.

FIG. 4 illustrates an example forecasting module 402, according to an embodiment of the present disclosure. In some embodiments, the forecasting module 108 of FIG. 1 can be implemented with the forecasting module 402. As shown in the example of FIG. 4, the forecasting module 402 can include an actual activity data module 404, a synthetic activity data module 406, and a visualization module 408.

In some embodiments, a machine learning model is trained to predict the synthetic user activity of a specified group of users in relation to the actual user activity corresponding to a set of different groups of users, as described above. For example, the actual data module 404 can obtain data corresponding to a specified user activity that was measured over a unit of time (e.g., an hour, day, week, etc.) subsequent to the specified event time for each group included in the set of different groups of users. This data may be obtained, for example, from the social networking system which can be configured to collect and store such data. The synthetic activity module 406 can provide the data obtained by the actual data activity module 404 to the machine learning model as input. In such embodiments, the machine learning model outputs a predicted amount of user activity for the specified group of users for the unit of time (e.g., hour, day, week, etc.).

Continuing with the example from above, if the model was trained to predict the number of likes performed by users in Portugal on a per day basis, then an example input to the model can include the respective number of likes measured on day n (after the specified event time) for each group included in the set of different groups of users (e.g., the respective number of likes measured for users in Spain on day n, the respective number of likes measured for users in China on day n, the respective number of likes measured for users in United States on day n, the respective number of likes measured for users in Ecuador on day n, the respective number of likes measured for users in India on day n, the respective number of likes measured for users in Brazil on day n, the respective number of likes measured for users in Australia on day n, the respective number of likes measured for users in England on day n, the respective number of likes measured for users in France on day n, etc.). In this example, the model outputs a predicted number of likes for users in Portugal for day n. In some embodiments, the model outputs prediction intervals for the requested unit of time (e.g., day n). In such embodiments, a prediction interval for a given unit of time (e.g., day n) provides an estimate of an interval in which user activity of the specified group of users will fall with a certain probability.

Figure 5:
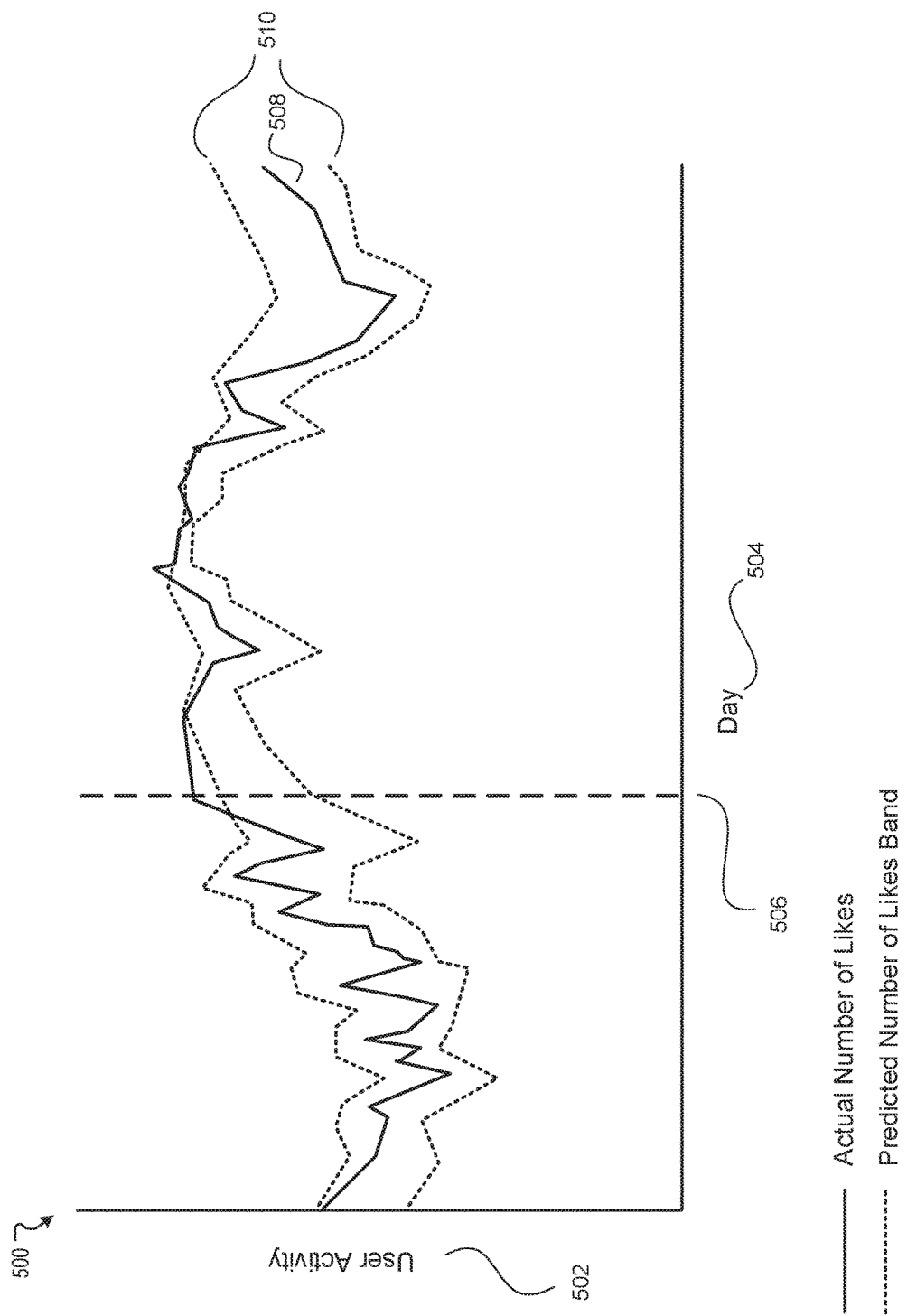
FIG. 5 illustrates an example illustration of a visual graph, according to various embodiments of the present disclosure.

In various embodiments, the visualization module 408 can generate a visual graph that illustrates the actual user activity measured for the specified group of users before and after the specified event time as illustrated in the example of FIG. 5. The visual graph also illustrates the predicted synthetic user activity for the specified group of users.

FIG. 5 illustrates an example visual graph 500, according to an embodiment of the present disclosure. In various embodiments, the visual graph 500 plots a user activity 502 for a specified group of users over time 504. The user activity 502 being measured and predicted can vary depending on the implementation as described above. Similarly, the user activity may be plotted over time 504 based on some specified unit of time (e.g., hourly, daily, weekly, monthly, etc.).

In the example of FIG. 5, the plotted user activity represents the number of likes performed by users 502 of a specified group of users (e.g., users located in a specified country) on a per day basis 504. In this example, the visual graph 500 plots the actual user activity 508, e.g., the number of likes, by the specified group of users over time. In addition, the visual graph 500 also illustrates a prediction band 510 that represents prediction intervals for user activity, e.g., the number of likes, by the specified group of users over time.

In some embodiments, the visual graph 500 also indicates 506 when a specified event time occurs, for example, using a line or marker. In various embodiments, synthetic control data is to be generated for the user activity (e.g., number of likes) of the specified group of users after the specified event time. As mentioned, in one example, the specified event time may correspond to the launch of a feature (e.g., software-based feature, interface, layout, etc.) to the specified group of users. When the new feature is made available to the specified group of users, the actual user activity measured 508 for that group of users can be compared against the synthetic, or predicted, user activity 510 for the group of users. This comparison can allow a determination as to what impact, if any, the launch of the new feature had on the group of users. In some instances, the specified event time may correspond to the time of a real world event (e.g., natural disaster, holiday, etc.) that has affected the specified group of users. Similarly, when such real-world event occur, the actual user activity measured 508 for that group of users can be compared against the synthetic, or predicted, user activity 510 for the group of users to determine what impact, if any, the real-world event had on the group of users.

Figure 6:
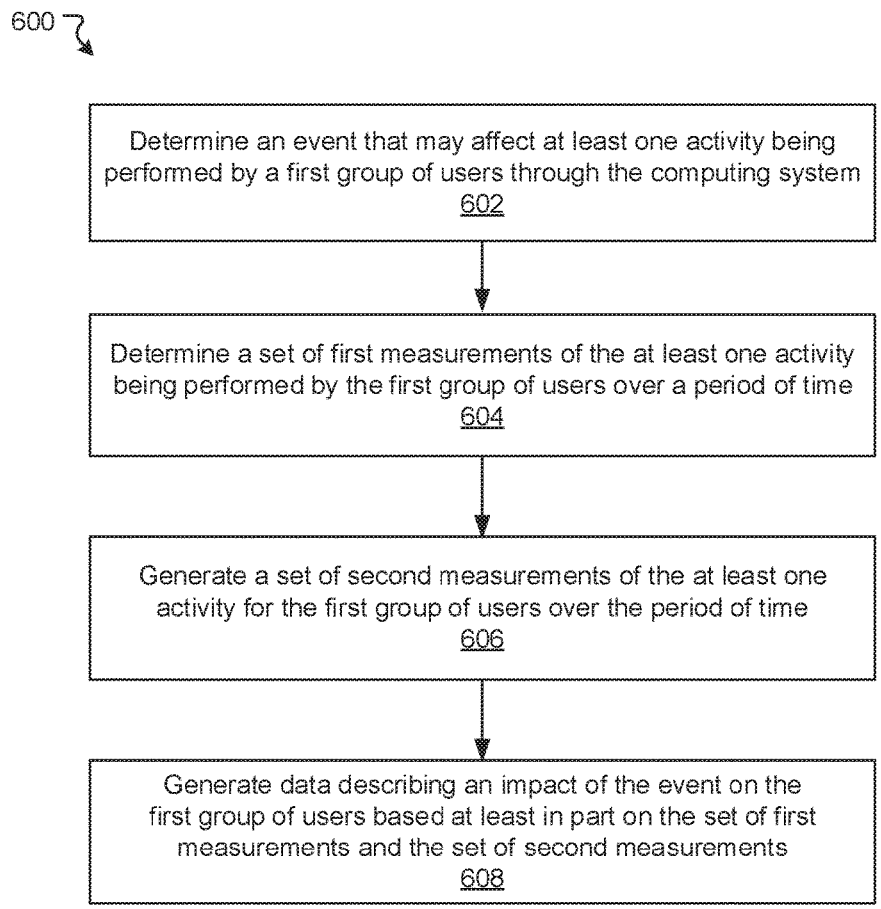
FIG. 6 illustrates an example method for determining an impact of an event on a group of users, according to an embodiment of the present disclosure.

FIG. 6 illustrates an example method 600 for determining an impact of an event on a group of users, according to an embodiment of the present disclosure. It should be appreciated that there can be additional, fewer, or alternative steps performed in similar or alternative orders, or in parallel, within the scope of the various embodiments discussed herein unless otherwise stated.

At block 602, the example method 600 can determine an event that may affect at least one activity being performed by a first group of users through the computing system. At block 604, a set of first measurements of the at least one activity being performed by the first group of users over a period of time are determined. At block 606, a set of second measurements of the at least one activity for the first group of users over the period of time are generated. The set of second measurements can be predicted based at least in part on a machine learning model. At block 608, data describing an impact of the event on the first group of users is generated based at least in part on the set of first measurements and the set of second measurements.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
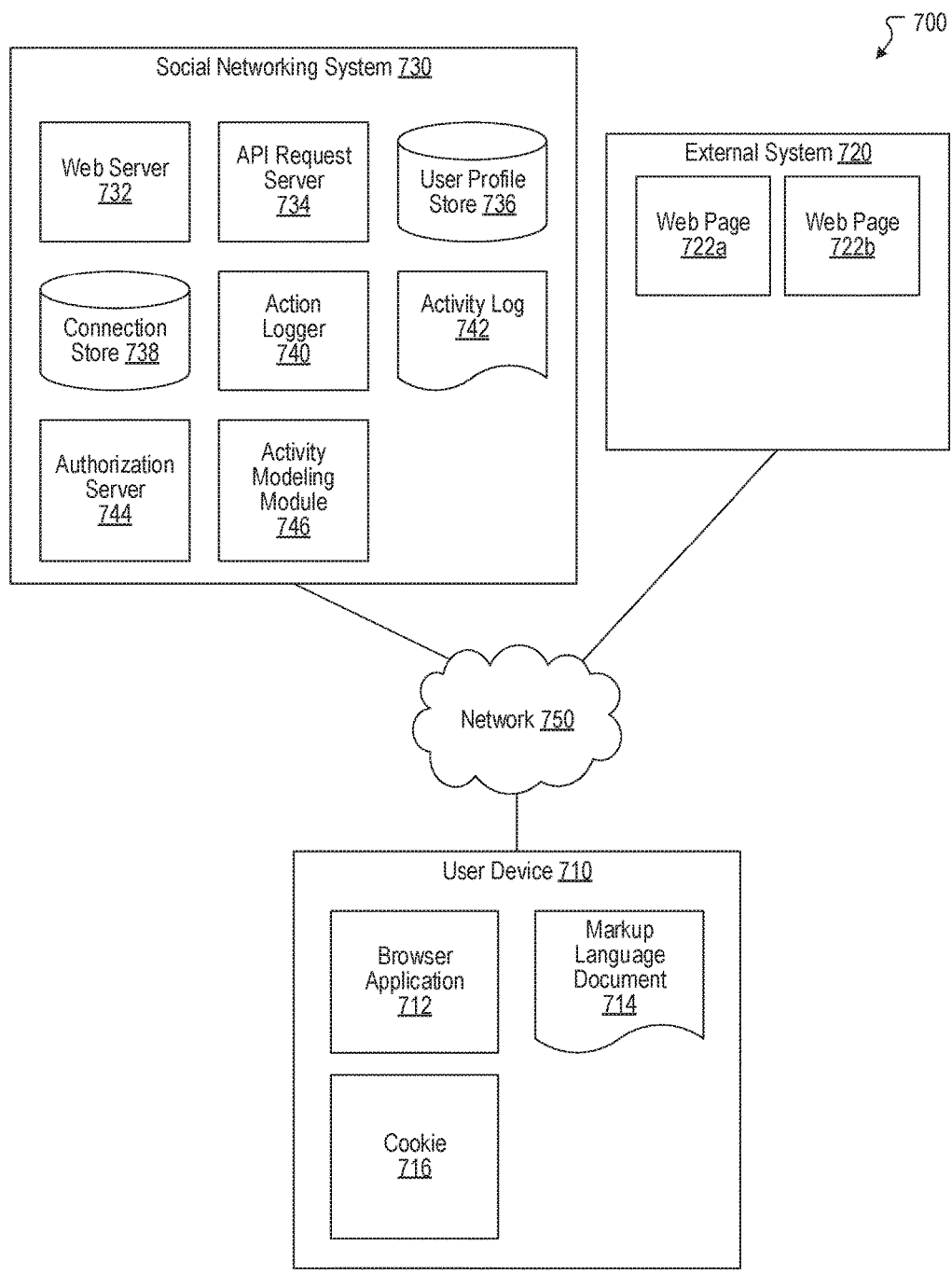
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content. As discussed previously, it should be appreciated that there can be many variations or other possibilities.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722*a* within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include an activity modeling module 746. The activity modeling module 746 can, for example, be implemented as the activity modeling module 102 of FIG. 1. In some embodiments, the activity modeling module 746, in whole or in part, may be implemented in a user device 710 or the external system 720. As discussed previously, it should be appreciated that there can be many variations or other possibilities.

Hardware Implementation

Figure 8:
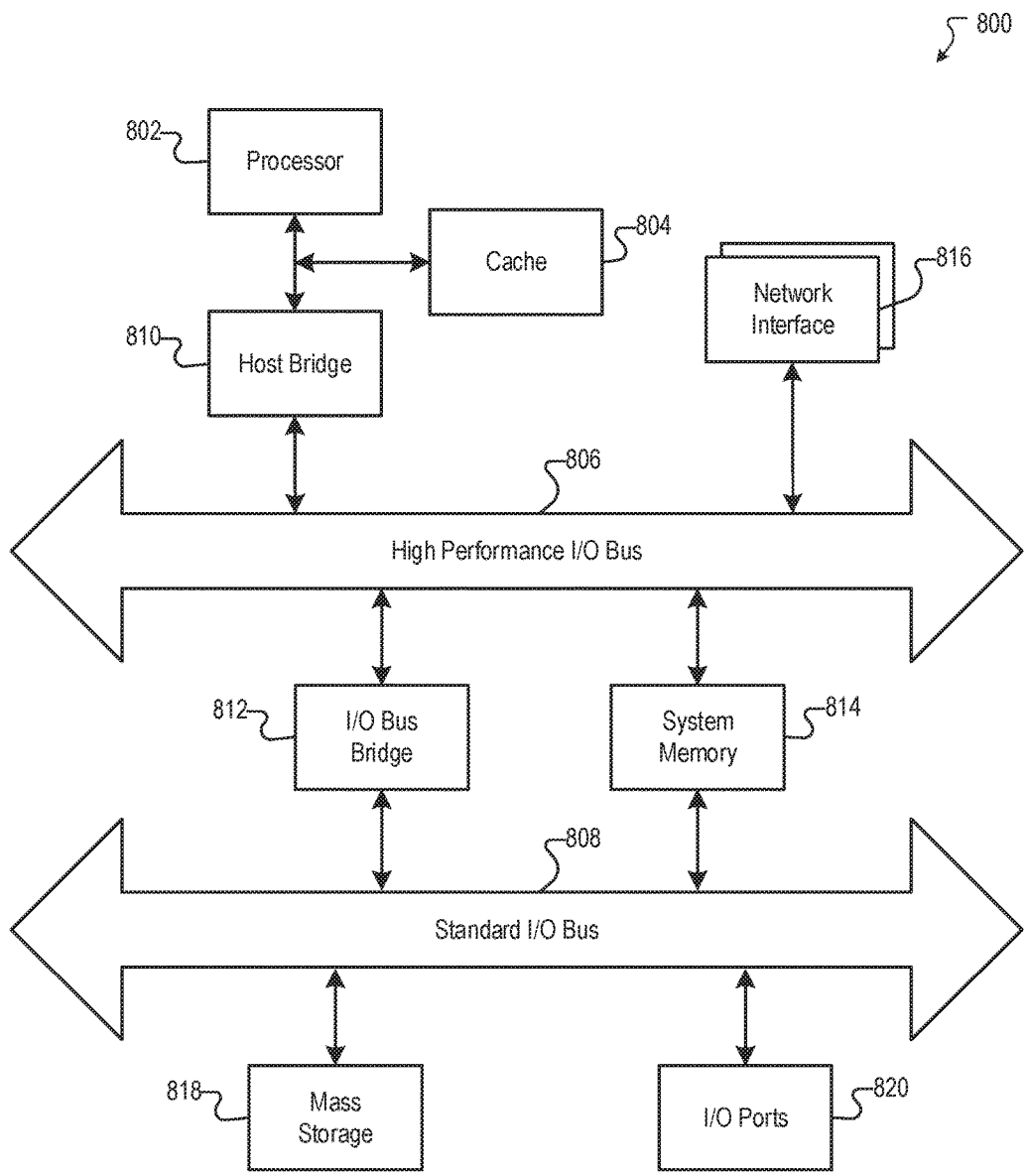
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS—), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   training, by a computing system, a machine learning model to output forecasted measurements of at least one activity for at least a first group of users, wherein the at least one activity includes a number of likes performed by the first group of users, and wherein the machine learning model is trained using a set of training examples that each include respective counts of the at least one activity having been performed by each group of users in a set of groups over some period of time that precedes an event, the set of groups including the first group of users and a plurality of different groups of users;
   determining, by the computing system, the event that may affect at least one activity being performed by a first group of users through the computing system;
   determining, by the computing system, a set of first measurements of the at least one activity being performed by the first group of users over a first period of time;
   generating, by the computing system, a set of second measurements of the at least one activity for the first group of users over a second period of time, wherein the set of second measurements are predicted based at least in part on the trained machine learning model, and wherein the set of second measurements for the first group of users are predicted based at least in part on the at least one activity having been performed by one or more groups of users in a set of groups, the set of groups not including the first group of users; and
   generating, by the computing system, data describing an impact of the event on the first group of users based at least in part on the set of first measurements and the set of second measurements.

2. The computer-implemented method of claim 1, wherein training the machine learning model further comprises:
   generating, by the computing system, a set of training examples that each include respective counts of the at least one activity having been performed by each group of users in a set of groups over a period of time that precedes the event, the set of groups including the first group of users and a plurality of different groups of users.

3. The computer-implemented method of claim 1, wherein generating the set of second measurements of the at least one activity for the first group of users further comprises:
   providing, by the computing system, respective counts of the at least one activity having been performed by each group of users in a set of groups during a unit of time to the machine learning model, the set of groups not including the first group of users, wherein the machine learning model outputs a predicted measurement of the at least one activity for the first group of users corresponding to the unit of time.

4. The computer-implemented method of claim 1, wherein the predicted measurement is a prediction interval within which a count of the at least one activity for the first group of users was expected had the event not occurred.

5. The computer-implemented method of claim 1, wherein generating data describing the impact of the event on the first group of users further comprises:

generating, by the computing system, a visual graph that plots the set of first measurements and the set of second measurements over the period of time.

6. The computer-implemented method of claim 1, wherein the first group of users includes users that are associated with a geographic region, users that share at least one specified demographic attribute, or users that share at least on specified behavioral attribute.

7. The computer-implemented method of claim 1, wherein determining the event that may affect at least one activity being performed by the first group of users through the computing system further comprises:
 determining, by the computing system, a date on which a feature is available to the group of users.

8. The computer-implemented method of claim 1, wherein determining the event that may affect at least one activity being performed by the first group of users through the computing system further comprises:
 determining, by the computing system, a date on which a real-world event was experienced by at least some of users in the first group of users.

9. The computer-implemented method of claim 1, wherein the at least one activity corresponds to: a number of likes performed, a number of comments posted, a number of content items shared, a number of content items accessed, a number of content items of a specified type accessed, a number of content items in a specified category accessed, an amount of time spent while accessing content items, or any combination of thereof.

10. A system comprising:
 at least one processor; and
 a memory storing instructions that, when executed by the at least one processor, cause the system to perform:
  training a machine learning model to output forecasted measurements of at least one activity for at least a first group of users, wherein the at least one activity includes a number of likes performed by the first group of users, and wherein the machine learning model is trained using a set of training examples that each include respective counts of the at least one activity having been performed by each group of users in a set of groups over some period of time that precedes an event, the set of groups including the first group of users and a plurality of different groups of users;
  determining the event that may affect at least one activity being performed by a first group of users through the computing system;
  determining a set of first measurements of the at least one activity being performed by the first group of users over a first period of time;
  generating a set of second measurements of the at least one activity for the first group of users over a second period of time, wherein the set of second measurements are predicted based at least in part on the trained machine learning model, and wherein the set of second measurements for the first group of users are predicted based at least in part on the at least one activity having been performed by one or more groups of users in a set of groups, the set of groups not including the first group of users; and
  generating data describing an impact of the event on the first group of users based at least in part on the set of first measurements and the set of second measurements.

11. The system of claim 10, wherein training the machine learning model further causes the system to perform:
 generating a set of training examples that each include respective counts of the at least one activity having been performed by each group of users in a set of groups over a period of time that precedes the event, the set of groups including the first group of users and a plurality of different groups of users.

12. The system of claim 10, wherein generating the set of second measurements of the at least one activity for the first group of users further causes the system to perform:
 providing respective counts of the at least one activity having been performed by each group of users in a set of groups during a unit of time to the machine learning model, the set of groups not including the first group of users, wherein the machine learning model outputs a predicted measurement of the at least one activity for the first group of users corresponding to the unit of time.

13. The system of claim 10, wherein the predicted measurement is a prediction interval within which a count of the at least one activity for the first group of users was expected had the event not occurred.

14. A non-transitory computer-readable storage medium including instructions that, when executed by at least one processor of a computing system, cause the computing system to perform a method comprising:
 training a machine learning model to output forecasted measurements of at least one activity for at least a first group of users, wherein the at least one activity includes a number of likes performed by the first group of users, and wherein the machine learning model is trained using a set of training examples that each include respective counts of the at least one activity having been performed by each group of users in a set of groups over some period of time that precedes an event, the set of groups including the first group of users and a plurality of different groups of users;
 determining the event that may affect at least one activity being performed by a first group of users through the computing system;
 determining a set of first measurements of the at least one activity being performed by the first group of users over a first period of time;
 generating a set of second measurements of the at least one activity for the first group of users over a second period of time, wherein the set of second measurements are predicted based at least in part on the trained machine learning model, and wherein the set of second measurements for the first group of users are predicted based at least in part on the at least one activity having been performed by one or more groups of users in a set of groups, the set of groups not including the first group of users; and
 generating data describing an impact of the event on the first group of users based at least in part on the set of first measurements and the set of second measurements.

15. The non-transitory computer-readable storage medium of claim 14, wherein training the machine learning model further causes the computing system to perform:
 generating a set of training examples that each include respective counts of the at least one activity having been performed by each group of users in a set of groups over a period of time that precedes the event, the set of groups including the first group of users and a plurality of different groups of users.

16. The non-transitory computer-readable storage medium of claim 14, wherein generating the set of second measurements of the at least one activity for the first group of users further causes the computing system to perform:

providing respective counts of the at least one activity having been performed by each group of users in a set of groups during a unit of time to the machine learning model, the set of groups not including the first group of users, wherein the machine learning model outputs a predicted measurement of the at least one activity for the first group of users corresponding to the unit of time.

17. The non-transitory computer-readable storage medium of claim 14, wherein the predicted measurement is a prediction interval within which a count of the at least one activity for the first group of users was expected had the event not occurred.

\* \* \* \* \*